US009164605B1

(12) United States Patent
Pirogov et al.

(10) Patent No.: US 9,164,605 B1
(45) Date of Patent: Oct. 20, 2015

(54) FORCE SENSOR BASELINE CALIBRATION

(75) Inventors: Oleksandr Pirogov, Lviv (UA);
Volodymyr Hutnyk, Ivano Frankivsk (UA); Oleksandr Karpin, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 818 days.

(21) Appl. No.: 12/699,741

(22) Filed: Feb. 3, 2010

(51) Int. Cl.
*G06F 3/041* (2006.01)

(52) U.S. Cl.
CPC .................... *G06F 3/041* (2013.01)

(58) Field of Classification Search
CPC ..................... G06F 3/0418; G06F 3/0414
USPC ................................... 345/173, 156
See application file for complete search history.

(56) References Cited

U.S. PATENT DOCUMENTS

| 5,796,483 | A | 8/1998 | Nakayama | |
|---|---|---|---|---|
| 5,854,625 | A | 12/1998 | Frisch | |
| 6,492,979 | B1 | 12/2002 | Kent et al. | |
| 7,158,122 | B2 | 1/2007 | Roberts | |
| 7,254,775 | B2 * | 8/2007 | Geaghan et al. | 715/701 |
| 7,511,702 | B2 | 3/2009 | Hotelling | |
| 7,532,202 | B2 | 5/2009 | Roberts | |
| 7,567,240 | B2 * | 7/2009 | Peterson et al. | 345/173 |
| 2006/0166681 | A1 | 7/2006 | Lohbihler | |
| 2006/0279548 | A1 * | 12/2006 | Geaghan | 345/173 |
| 2006/0293864 | A1 * | 12/2006 | Soss | 702/104 |
| 2009/0140989 | A1 * | 6/2009 | Ahlgren | 345/173 |
| 2009/0146533 | A1 | 6/2009 | Leskinen et al. | |
| 2009/0195518 | A1 * | 8/2009 | Mattice et al. | 345/177 |

* cited by examiner

*Primary Examiner* — Sahlu Okebato

(57) ABSTRACT

An apparatus may include processing logic coupled with a force sensor input and a touch sensor input. The processing logic is configured to determine a relative force magnitude based on a force signal received at the force sensor input and a baseline measurement of the force sensor. The processing logic updates the baseline measurement in response to detecting that the touch signal indicates the absence of the one or more touches from the sensing surface.

24 Claims, 12 Drawing Sheets

FORCE SENSOR BASELINE CALIBRATION

TECHNICAL FIELD

This disclosure relates to the field of user interface devices and, in particular, to determining forces applied by each of one or more touches at a touch sensing surface.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to press the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

Figure 1:
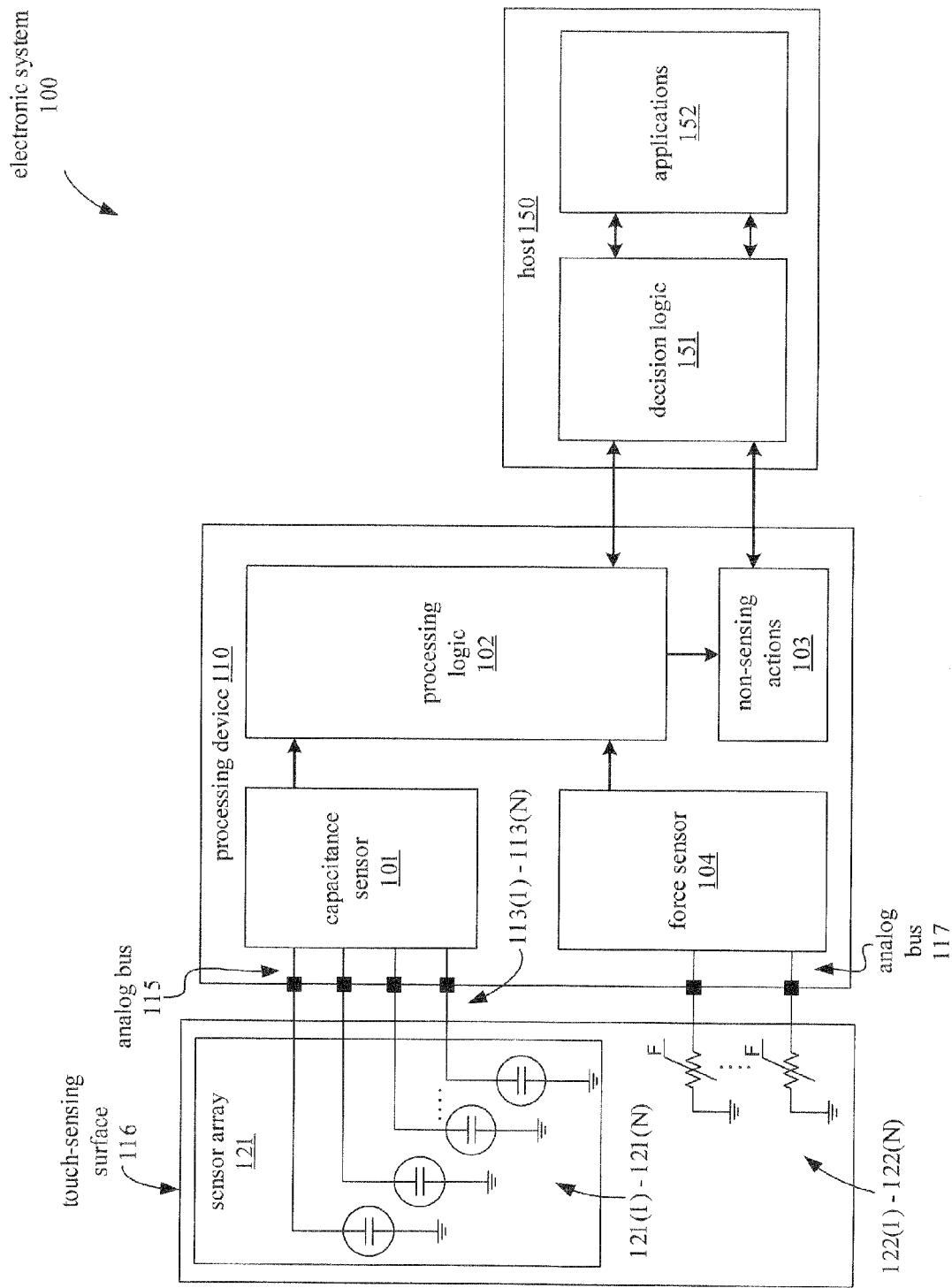
FIG. 1 illustrates a block diagram of an embodiment of an electronic system that processes touch sensor and force sensor data.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

In an embodiment, an electronic system includes a touch sensing surface. This sensing surface may include touch sensors for detecting a presence and location of one or more touches at the sensing surface, such as an array of capacitive sensor elements. The sensing surface may also include a force sensor that determines a magnitude of force applied by the one or more touches at the sensing surface. The force sensor may include a set of force sensitive elements, such as force sensing resistors (FSRs). The electronic system may also include processing logic that receives signals from the touch sensors and force sensor and, based on these signals, calculates a component force associated with each of the touches at the sensing surface.

An embodiment of such an electronic system, which is capable of calculating multiple touch forces, is programmed as an input device that allows a user to perform complex gestures based on single or multiple forces applied, the locations or motions of single or multiple touches, or a combination of such locations, motions, and forces. For example, such a system may be able to give a user haptic feedback proportional to force applied, disregard false touches below a force threshold (particularly in an on-screen keyboard application), and replace on/off buttons or other buttons.

In an embodiment of an electronic system having a force sensor, the accuracy of the measured forces may be affected by material relaxation, hysteresis, aging effects, temperature drift, and other error sources. For example, false touch triggering may occur if the level of the raw signal increases to near or above a touch detection threshold as a result of error in the force sensor.

In an embodiment, a force sensor begins in an initial state, has a force applied to it by a touch, and because of the mechanical nature of the force sensor, returns to a second state that is not the same as the initial state after the force of the touch is removed. Thus, the force sensor registers a different raw force signal after the touch is removed as compared to before the touch is applied. If this second raw force signal exceeds a touch detection threshold, the system may not accurately detect the removal of the touch. Furthermore, even if the removal of the touch is detected, the likelihood of false touches being registered may increase if the second raw force signal is near the touch detection threshold.

In an embodiment, a system for detecting a force applied by one or more touches compares the raw force signal generated by a force sensor with a baseline measurement of the force sensor. The difference between the raw force signal and the baseline measurement is a relative force signal, which represents the actual force applied to the sensing surface by the one or more touches.

The system may also include a touch sensor, which may include an array of capacitive sensor elements, to detect the presence or absence of the one or more touches from the sensing surface. When no touches are detected at the sensing surface by the touch sensor, processing logic in the system updates the baseline measurement. In an embodiment, the processing logic is configured to update the baseline measurement by setting the current raw force signal, acquired at a time when no touch is present at the sensing surface, as the baseline measurement.

Using this technique, the baseline measurement is updated so that the force applied to the sensing surface by subsequent touches can be accurately measured relative to the new baseline measurement, even if the raw force signal does not return to its previous state after the first touch is removed.

In an embodiment, the relative force is determined from the difference between the baseline measurement and the total force measured by the force sensor. Once the relative force is determined, the magnitude and centroid location of the relative force and the locations of multiple touches, as determined by the touch sensor, can be used to calculate a component force for each of the multiple touches. In an embodiment, the relative force represents a force (relative to the baseline measurement) that is applied collectively by all of the touches contacting the sensing surface, while a component force represents a force applied by a single touch, at a single location. A relative force may also be a force (relative to the baseline measurement) that is measured by one of a number of force sensitive elements of a force sensor.

In an embodiment, the component forces are determined using the centroid location of the relative force, where the relative force represents the total relative force measured by the force sensor. The centroid designates a point on the sensing surface where the force applied to the sensing surface is centered. The centroid may be envisioned as the "center of weight" of the forces applied to the sensing surface. For example, if the force on the sensing surface is applied at only one point, the centroid is at the same location as the point where the force is applied. If the force is distributed evenly over the entire sensing surface, the centroid is in the geometric center of the surface.

In an embodiment, the component forces are determined using a system of equations, such as a system of equations derived from a lever balance equation, that relates the locations of the multiple touches to the location and magnitude of the centroid.

FIG. 1 illustrates a block diagram of an embodiment of an electronic system 100 including processing logic 102 that is configured to determine component forces for a number of multiple touches based on a baseline measurement that is updated upon detecting the absence of one or more touches at a sensing surface. The electronic device 100 includes a touch-sensing surface 116 (e.g., a touchscreen, or a touch pad) coupled to a processing device 110 and a host 150. In an embodiment, the touch-sensing surface 116 is a two-dimensional user interface that uses a sensor array 121 to detect touches on the surface 116. Electronic device 100 also includes a force sensor 104 connected to an array of force sensitive elements 122(1)-122(N). In an embodiment, the force sensitive elements 122(1)-122(N) are force-sensing resistors (FSRs). In an embodiment, force sensor 104 is connected with force sensitive elements 122(1)-122(N) through analog bus 117.

In an embodiment, the sensor array 121 includes sensor elements 121(1)-121(N) (where N is a positive integer) that are disposed as a two-dimensional matrix (also referred to as an XY matrix). The sensor array 121 is coupled to pins 113 (1)-113(N) of the processing device 110 via an analog bus 115 transporting multiple signals. In this embodiment, each sensor element 121(1)-121(N) is represented as a capacitor. The capacitance of each sensor in the sensor array 121 is measured by a capacitance sensor 101 in the processing device 110.

In an embodiment, the capacitance sensor 101 may include a relaxation oscillator or other means to convert a capacitance into a measured value. The capacitance sensor 101 may also include a counter or timer to measure the oscillator output. The capacitance sensor 101 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over a certain threshold.

In an embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array, tracking the motion of the object, or other information related to an object detected at the touch sensor.

In an embodiment, processing logic 102 also receives from force sensor 104 a force signal indicating forces detected by force sensitive elements 122(1)-122(N). The force sensitive elements 122(1)-122(N) may be positioned to detect forces applied to touch sensing surface 116. For example, the force sensitive elements 122(1)-122(N) may be positioned at the corners of the sensing surface 116 or interspersed throughout the surface 116. The processing logic 102 may perform calculations based on the force signal, such as determining a location of a force centroid based on the individual forces applied to each of force sensitive elements 122(1)-122(N), or calculating the total force applied collectively to all of the force sensitive elements 122(1)-122(N). In an embodiment, the force sensitive elements 122(1)-122(N) may be implemented with force sensing devices such as FSRs, piezoelectric force sensors, force sensitive capacitance, or another type of transducer that converts force to an electrical signal.

In an embodiment, the processing logic 102 determines component forces for multiple touches using a baseline measurement. In an embodiment, the processing logic 102 also manages the updating of the baseline measurement upon detecting the absence of one or more touches at sensing surface 116.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In an embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In an embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
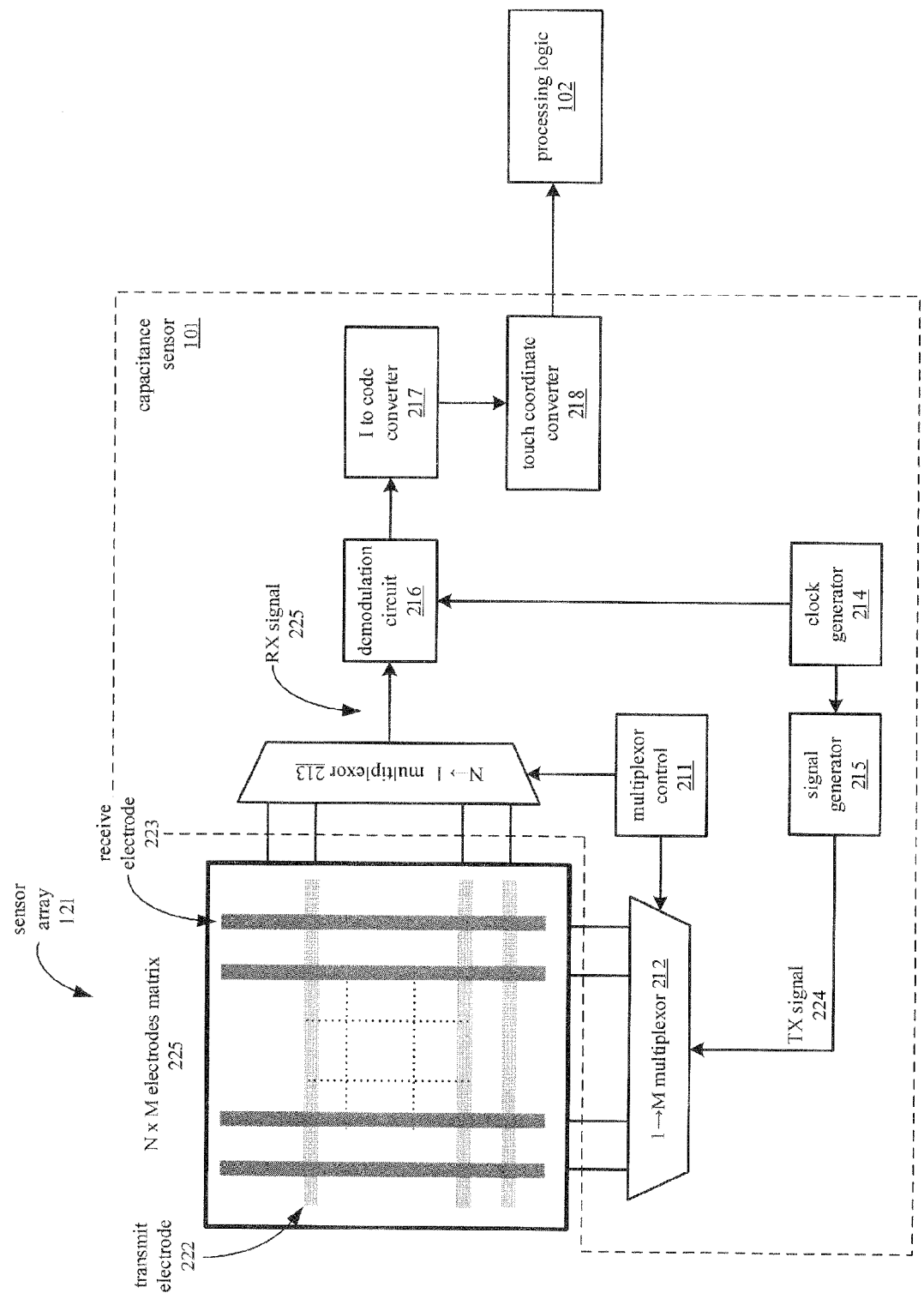
FIG. 2 illustrates a block diagram of an embodiment of an electronic system that processes touch sensor data.

FIG. 2 is a block diagram illustrating an embodiment of a capacitive touch sensor array 121 and a capacitance sensor 101 that converts measured capacitances to coordinates. In an embodiment, sensor array 121 and capacitance sensor 101 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through multiplexers 212 and 213.

Capacitance sensor 101 includes multiplexer control 211, multiplexers 212 and 213, clock generator 214, signal generator 215, demodulation circuit 216, and analog to digital converter (ADC) 217. ADC 217 is further coupled with touch coordinate converter 218. Touch coordinate converter 218 outputs a signal to the processing logic 102.

The transmit and receive electrodes in the electrode matrix 225 may be arranged so that each of the transmit electrodes overlap and cross each of the receive electrodes such as to form an intersection, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 intersect.

Clock generator 214 supplies a clock signal to signal generator 215, which produces a TX signal 224 to be supplied to the transmit electrodes of touch sensor 220. In an embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with multiplexer 212, which allows the TX signal 224 to be applied to any of the M transmit electrodes of touch sensor 220. In an embodiment, multiplexer control 211 controls multiplexer 212 so that the TX signal 224 is applied to each transmit electrode in a controlled sequence. Multiplexer 212 may also be used to ground, float, or connect an alternate signal to the other transmit electrodes to which the TX signal 224 is not currently being applied.

Because of the capacitive coupling between the transmit and receive electrodes, the TX signal 224 applied to each transmit electrode induces a current within each of the receive electrodes. For instance, when the TX signal 224 is applied to transmit electrode 222 through multiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The capacitance associated with each intersection between a TX electrode and an RX electrode can be sensed by selecting every available combination of TX electrode and an RX electrode using multiplexers 212 and 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a decrease in the mutual capacitance between only some of the electrodes. For example, if a finger is placed near the intersection of transmit electrode 222 and receive electrode 223, the presence of the finger will decrease the mutual capacitance between the two electrodes 222 and 223. Thus, the location of the finger on the touchpad can be determined by identifying the one or more receive electrodes having a decreased mutual capacitance in addition to identifying the transmit electrode to which the TX signal 224 was applied at the time the decreased mutual capacitance was measured on the one or more receive electrodes.

By determining the mutual capacitances associated with each intersection of electrodes in the matrix 225 the locations of one or more contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current waveform 227 is rectified by demodulation circuit 216. The rectified current output by demodulation circuit 216 can then be filtered and converted to a digital code by ADC 217.

The digital code is converted to touch coordinates indicating a position of an input on touch sensor array 121 by touch coordinate converter 218. The touch coordinates are transmitted as an input signal to the processing logic 102.

In an embodiment, the sensor array 121 can be configured to detect multiple touches. One technique for multi-touch detection uses a two-axis implementation: one axis to support rows and another axis to support columns. Additional axes, such as a diagonal axis, implemented on the surface using additional layers, can allow resolution of additional touches.

Another method for multi-touch detection has the user insert a time delay between the first and subsequent touches on the touch-sensing surface.

In an embodiment of a system that supports multiple touch detection, processing logic 102 may receive touch coordinates for each of a number of simultaneous touches at the sensing surface. The processing logic 102 may further use these touch coordinates to determine factors such as the number of touches present at the sensing surface, or may use the touch coordinates when calculating a component force for each of the touches.

Figure 3:
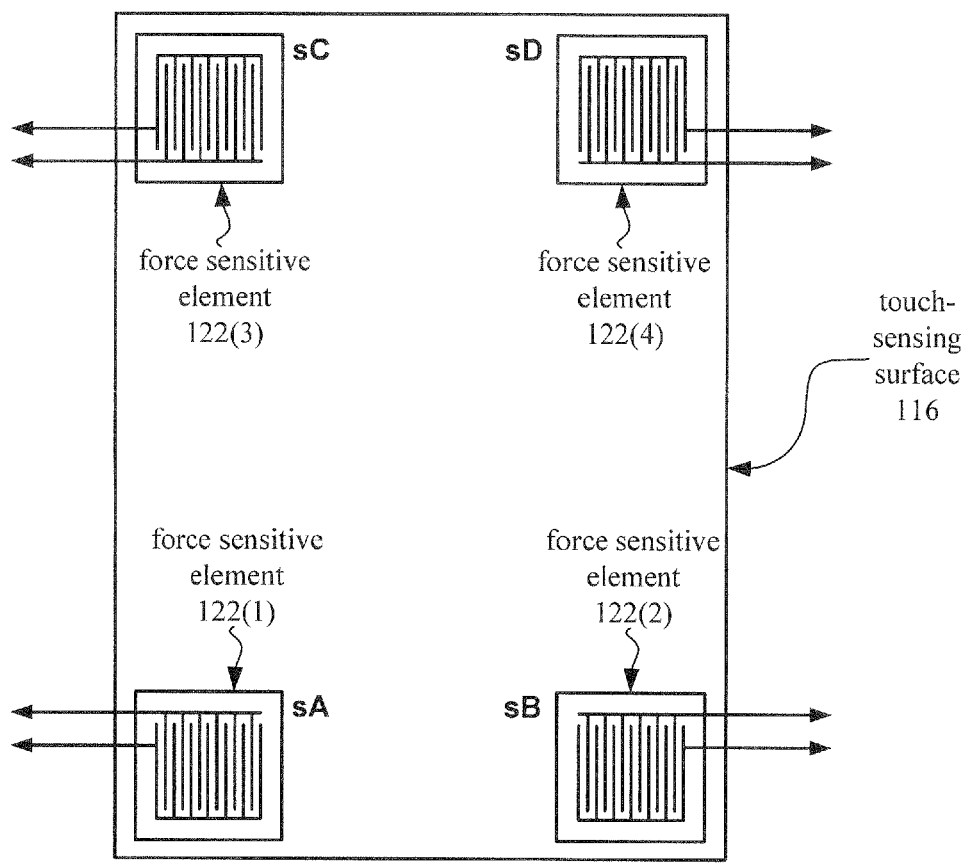
FIG. 3 illustrates an embodiment of a touch sensing surface that includes force-sensing resistors.

FIG. 3 illustrates an embodiment of a touch sensing surface 116 that includes force sensitive elements 122(1)-122(4). In an embodiment, touch sensing surface 116 may be layered over an array of capacitive sensor elements similar to sensor array 121. In an embodiment, capacitive sensing techniques using mutual capacitance measurement, such as the capacitive sensing techniques described with reference to FIGS. 1 and 2, may be used to measure capacitances of the capacitive sensor elements while measuring forces using force sensitive elements, such as force sensitive elements 122(1)-122(4).

Alternatively, force sensitive elements may be used in a single-touch sensing system, pseudo-multitouch system, or other capacitive touch sensing system that operates by measuring self-capacitance of capacitive sensor elements.

Touch sensing surface 116 and force sensitive elements 122(1)-122(4) may be connected with a processing device 110 as described above with reference to FIG. 1.

In an embodiment, each of force sensitive elements 122(1)-122(4) has an initial resistance that changes in response to force applied to the force sensitive element. For example, an force sensitive element may include a conductor that deforms in response to strain or stress, changing the resistance of the conductor.

In an embodiment, the sensing surface 116 is rectangular and the force sensitive elements 122(1)-122(4) are placed at the corners of the sensing surface 116. In alternative embodiments, devices used to implement force sensitive elements may include piezoelectric sensors, force sensitive capacitances, or any other devices that can convert applied force to an electrical signal.

In an embodiment, signals from the force sensitive elements 122(1)-122(4) are used to calculate a magnitude and a location of a force centroid for the force applied by multiple touches at the sensing surface 116. The force centroid location indicates the "center of weight" of the applied force. The calculations for determining the magnitude of force and the location of the force centroid may be performed, for example, in processing logic 102 of processing device 110 or in host 150.

In an embodiment, the magnitude of the total force applied to the sensing surface 116 by the multiple touches is proportional to the sum of forces applied to each of the force sensitive elements 122(1)-122(4). For example, the processing logic 102 may calculate the magnitude by adding the individual forces measured by each of the force sensitive elements 122(1)-122(4). Alternatively, the processing logic 102 may calculate the magnitude as an average of the individual forces measured by each of the force sensitive elements 122(1)-122(4). The magnitude may be calculated similarly for other systems that have fewer or more than four force sensitive elements, or use other types of sensors in place of force sensitive elements.

In an embodiment, the magnitudes of the individual forces measured by each force sensitive element or sensor are determined relative to a baseline measurement. For example, a force sensitive element may be used to generate a raw force signal from which the baseline measurement is subtracted to generate a relative force signal for the force sensitive element. Where the baseline measurement represents the raw force signal that is generated by the force sensitive element when no force is applied to the force sensitive element, the relative force signal for force sensitive element more accurately represents the force applied to the force sensitive element.

In an alternative embodiment, the total force signal may be calculated (i.e., by summing or averaging the raw force sensitive element force signals), and the difference between the total force signal and the baseline measurement may be calculated to generate a total relative force signal.

In an embodiment, the baseline measurement is updated according to a recalibration scheme to compensate for errors due to the physical nature of the force sensitive element, which results in a raw force signal that does not return to its previous state after a touch is lifted from the sensing surface. This effect is illustrated in FIGS. 4A, 4B, and 4C.

Figure 4A:
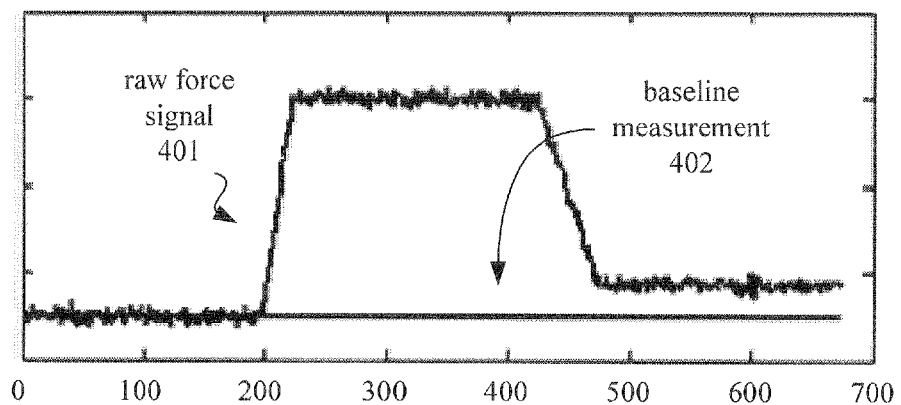
FIG. 4 is a set of graphs illustrating signals associated with a single touch and release at a sensing surface, according to an embodiment.
Figure 4B:
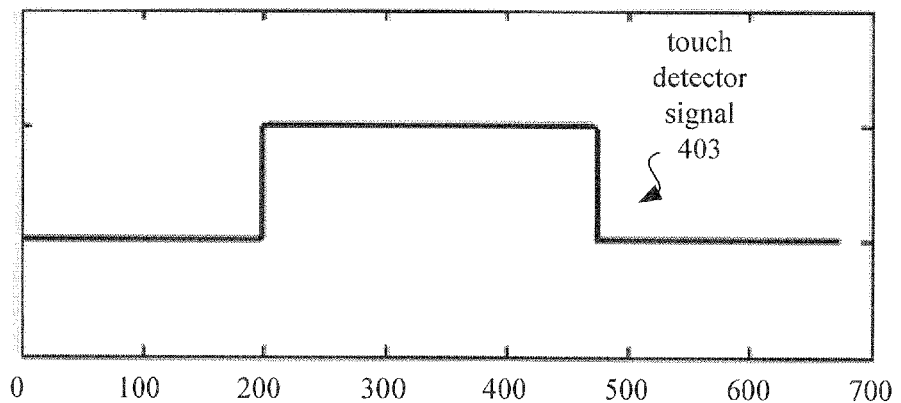
Figure 4C:
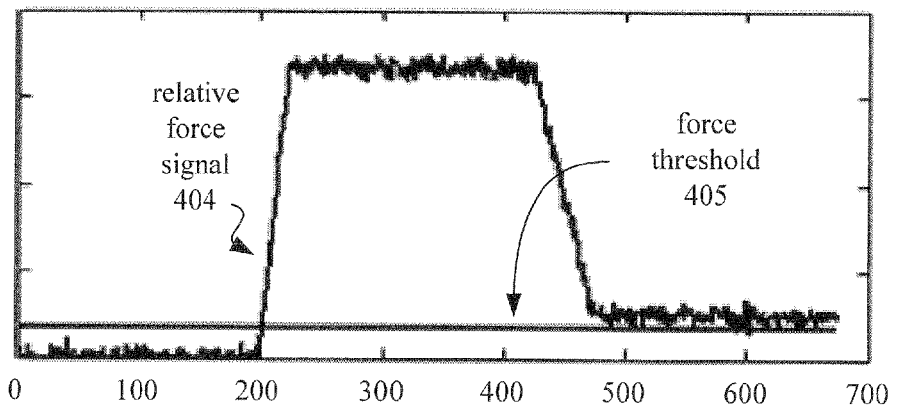

FIGS. 4A-4C are graphs illustrating signals associated with a single touch and release at a sensing surface, according to an embodiment of an electronic system where baseline recalibration is not enabled. The graphs in FIG. 4 plot changes in these signals over time, in milliseconds.

With reference to FIG. 4A, the raw force signal 401 represents a signal from one force sensitive element or may also correspond to an average or sum of more than one force sensitive element. In an embodiment where another type of force sensing device is used, such as a piezoelectric force sensor or force sensitive capacitance, the signal from the other type of force sensing device may have similar characteristics as the raw force signal 401.

The raw force signal 401 has a rising edge and a falling edge, which correspond to a touch being placed on the sensing surface and subsequently being removed from the sensing surface, respectively. Baseline measurement 402 ideally indicates the level of the raw force signal 401 when no touch is present, however, the raw force signal 401 does not return to its previous state after the touch is lifted. Thus, the raw force signal 401 is significantly higher than the baseline measurement 402 even after the touch is lifted from the sensing surface.

With reference to FIG. 4B, touch detector signal 403 is a signal representing whether a touch is present or absent from the sensing surface. In an embodiment, the touch detector signal 403 may be generated based on a signal from a touch sensor, such as an array of capacitive sensor elements, or a surface acoustic wave touch sensing device. For example, in an electronic system having a capacitive touch sensor, the touch detector signal may be high when the capacitance of the touch sensor exceeds a threshold value, indicating a touch at the sensing surface.

With reference to FIG. 4C, the relative force signal 404 represents the difference between the raw force signal 401 and the baseline measurement 402. The relative force signal 404 is ideally an accurate representation of the force applied to the force sensitive element, since it removes the offset attributable to the baseline force signal, which is the raw force signal when no touch is present at the sensing surface. However, since the raw force signal does not return to its previous state after the touch is removed, the relative force signal 404 has an offset after the touch is removed.

In an embodiment, the electronic system may perform some action based on whether the relative force signal 404 exceeds a force threshold 405. In a situation where the updating of the baseline measurement 402 is not enabled, the relative force signal 404 may continue to exceed the force threshold 405 even after a touch is removed from the sensing surface. Thus, such an electronic system may erroneously perform the action associated with the force threshold 405 even when the touch is absent from the sensing surface.

Figure 5A:
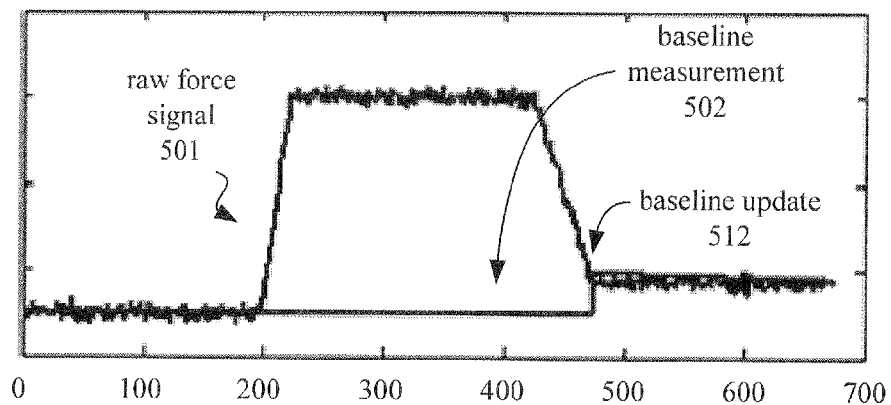
FIG. 5 is a set of graphs illustrating signals associated with a single touch and release at a sensing surface, according to an embodiment.
Figure 5B:
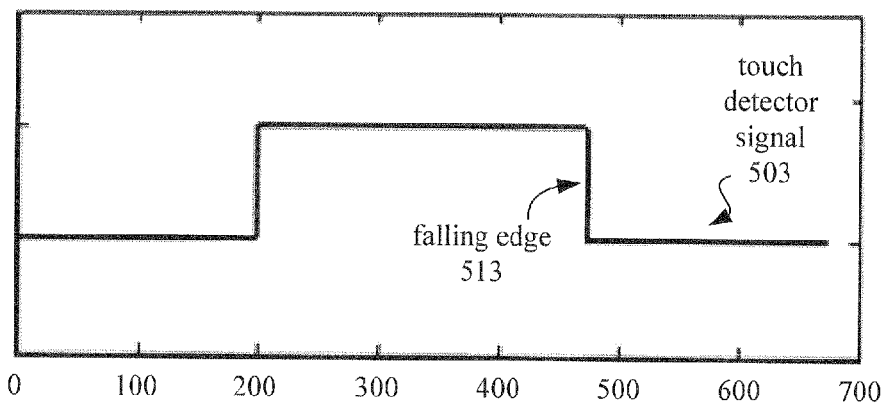
Figure 5C:
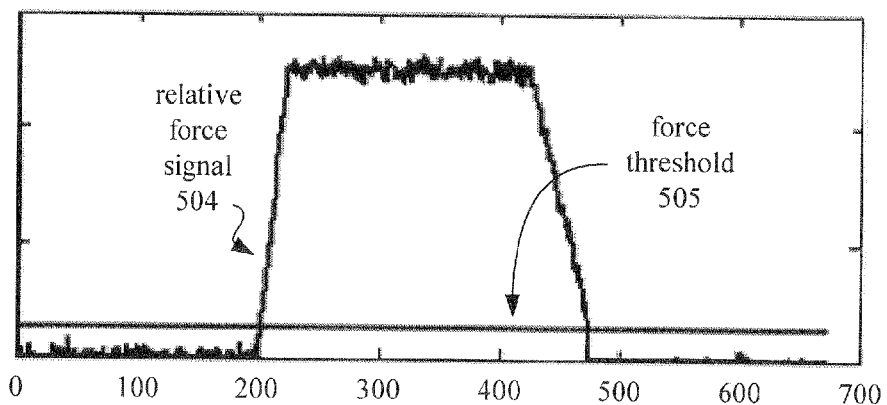

FIGS. 5A, 5B, and 5C are graphs illustrating signals associated with a single touch and release at a sensing surface, according to an embodiment of an electronic system implementing baseline recalibration.

With reference to FIG. 5A, in an embodiment of an electronic system in which recalibration by updating the baseline measurement 502 is enabled, the system includes processing logic, such as processing logic 102, which manages recalibration of the baseline measurement 502. The processing logic 102 performs the update of the baseline measurement based on the raw force signal 501, and the touch detector signal 503.

With reference to FIG. 5B, in an embodiment, the processing logic detects the falling edge 513 of touch detector signal 503, which corresponds to removal of a touch from the sensing surface, and updates the baseline measurement 502 in response to detecting the falling edge 513. The update of baseline measurement 502 occurs at the baseline update time 512. In an embodiment, the baseline update time 512 is the time at which the falling edge 513 is detected. Alternatively, the baseline update 512 may be delayed with respect to the falling edge 513.

With reference to FIG. 5C, the processing logic 102 may update the baseline measurement 502 by measuring the raw force signal and storing the measurement in a memory as a new baseline measurement. The processing logic 102 subsequently accesses the stored measurement when calculating the relative force signal 504.

Thus, even though the signal level of the raw force signal 501 does not return to its previous pre-touch state, the new baseline measurement compensates for the difference in the post-touch offset. The relative force signal 504, which represents the difference between the raw force signal 501 and the baseline measurement 502, more accurately represents the force applied to the sensing surface after the touch has been lifted. In particular, the relative force signal 504 accurately indicates that no force is being applied to the sensing surface after removal of the touch.

In an embodiment where the electronic system performs an action based on the relative force signal 504, the action may be triggered when the relative force signal exceeds a force threshold 505. In a system where recalibration by updating the baseline measurement is enabled, the action associated with the force threshold 505 is not erroneously performed as a result of the relative force signal 504 exceeding the force threshold 505 when no touch is present at the sensing surface.

In an embodiment, the baseline recalibration allows the electronic system to ignore non-capacitive touches at the sensing surface. For example, in an embodiment, the touch sensor is a capacitive touch sensor. If the touch sensor does not detect a touch at the sensing surface, the relative force signal is zero even when a non-capacitive force is applied to the sensing surface. Thus, a force applied to the touch sensing surface is not registered as a touch unless it is also detected by the touch sensor.

Figure 6A:
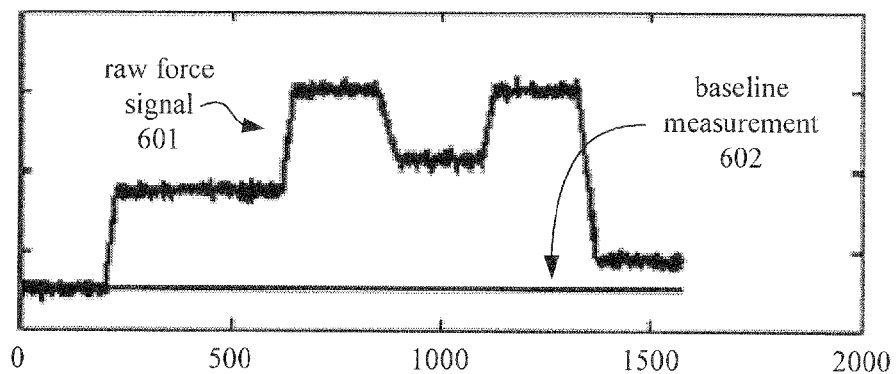
FIG. 6 is a set of graphs illustrating signals associated with multiple touches and releases at a sensing surface, according to an embodiment.
Figure 6B:
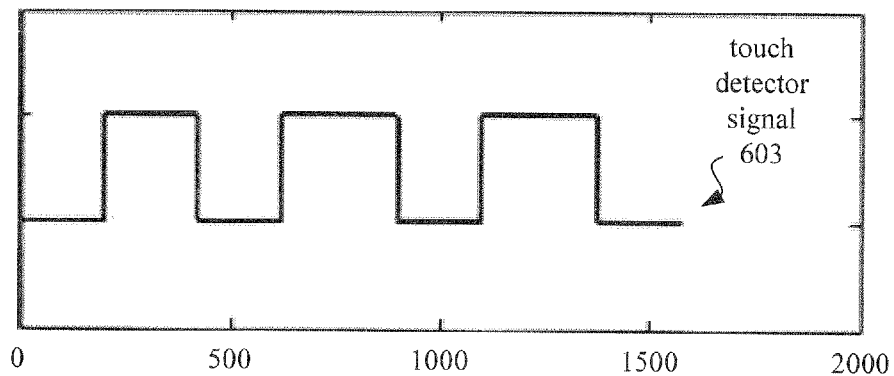
Figure 6C:
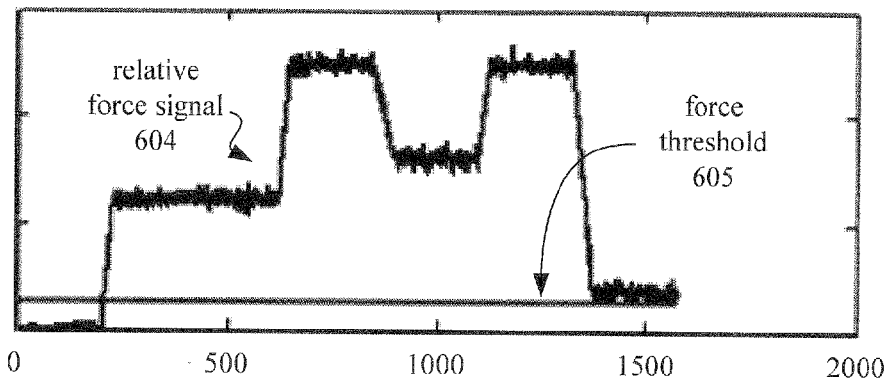

FIGS. 6A, 6B, and 6C are graphs illustrating signals associated with multiple touches and releases at a sensing surface, according to an embodiment of an electronic system where baseline recalibration is not enabled.

With reference to FIG. 6A, the raw force signal 601 changes in response to three touches that are applied to and lifted from the sensing surface. After each touch, the raw force signal 601 returns to a different baseline. The baseline measurement 602, however, is not updated. With reference to FIG. 6B, touch detector signal 603 changes in response to the same three touches, and more clearly indicates the beginning and end of each touch, as compared to the raw force signal 601.

With reference to FIG. 6C, the relative force signal 604 represents the difference between the raw force signal 601 and the baseline measurement 602. In an embodiment, the electronic system is configured to perform an action when the relative force signal 604 exceeds force threshold 605. Without the baseline recalibration, the relative force signal 604 exceeds the force threshold 605 after the initial touch, even after the touch is removed. The force threshold 605 does not detect either of the subsequent touches. In an embodiment of an electronic system where the force threshold 605 is associated with an action to be performed once for every touch, the electronic system would erroneously fail to perform the action once for each of the three touches.

For example, the sensing surface may be used to control a cursor in a drawing program, where the size of the cursor changes between two or more sizes according to the force applied to the sensing surface. In this example, the force threshold 605 may determine when the cursor size increases to the next size. Thus, without the baseline recalibration, the cursor changes size once when it ideally should have changed to the next size and back three times, in response to three touches.

Figure 7A:
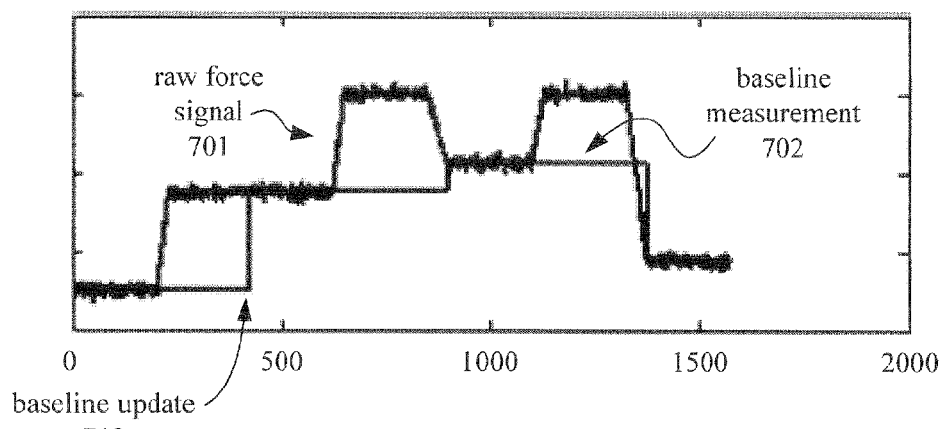
FIG. 7 is a set of graphs illustrating signals associated with multiple touches and releases at a sensing surface, according to an embodiment.
Figure 7B:
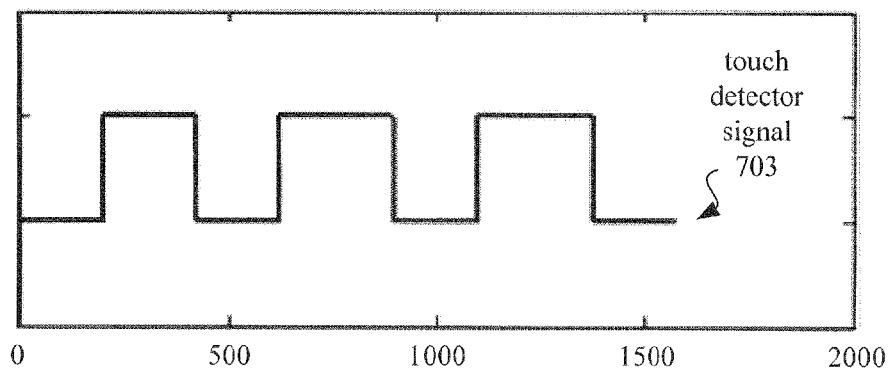
Figure 7C:
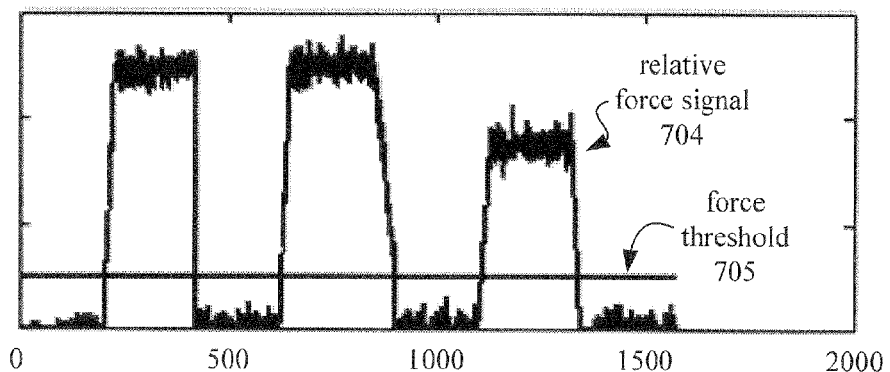

FIGS. 7A, 7B, and 7C are graphs illustrating signals associated with multiple touches and releases at a sensing surface, according to an embodiment of an electronic system where baseline recalibration is enabled.

In FIG. 7A, the baseline measurement 702 is updated three times, starting at baseline update 712. The three updates of baseline measurement 702 occur in response to three falling edges of touch detector signal 703 of FIG. 7B, which indicate that a touch has been lifted from the sensing surface.

With regard to FIG. 7C, the relative force signal 704 represents the difference between the raw force signal 701 and the baseline measurement 702. Because of the updates of baseline measurement 702, the relative force signal more accurately indicates the magnitude of the force applied by each of the multiple touches at the sensing surface, as compared to relative force signal 604, where baseline recalibration is not enabled.

Force threshold 705, which may be associated with an action as previously described, is exceeded three times by relative force signal 704, in accord with the three touches indicated by touch detector signal 303.

In an embodiment, the baseline recalibration is performed separately for each of the force sensitive elements or other force sensing devices in the touch sensing surface. Using the relative force signal from each of the force sensitive elements, the processing logic 102 may determine a position of a force centroid, which indicates the "center of weight" of the force applied to the sensing surface. For example, if a force is applied at the sensing surface closer to a first force sensitive element than to a second force sensitive element, the first force sensitive element will measure a greater force than the second force sensitive element. Thus, based on the weighting of forces measured by each of the force sensitive, the processing logic can determine the centroid location.

In an embodiment, the raw force signal may be used to detect one or more non-capacitive touches at the sensing surface. For example, the processing logic may update the baseline measurement in response to detecting that the raw force signal is below a threshold level. In an embodiment, the update of the baseline measurement may be implemented using a low-pass filter (LPF), such as an infinite impulse response (IIR) or finite impulse response (FIR) filter. When the raw force signal exceeds the threshold, the baseline measurement is not updated. Thus, the relative force signal is proportional to the force component of the non-capacitive touch. In an embodiment, the updating of the baseline measurement may be periodic.

The periodic updating of the baseline measurement may also be used in combination with updating of the baseline measurement in response to detecting the removal of one or more touches at the touch sensing surface. This combination scheme may be used, for example, when detecting both capacitive and non-capacitive touches at the touch sensing surface.

Figure 8:
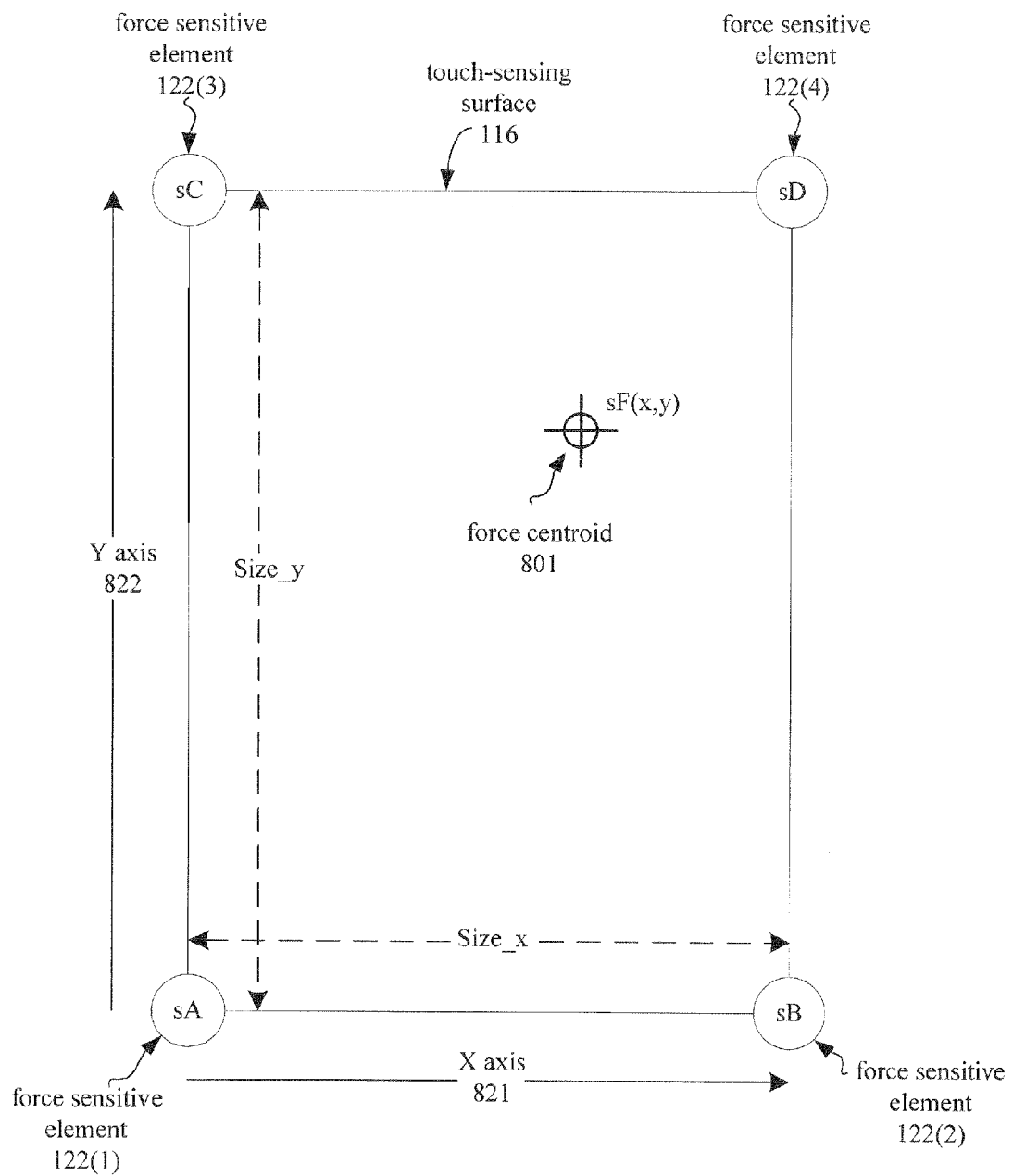
FIG. 8 illustrates an embodiment of a touch sensing surface.

FIG. 8 illustrates an embodiment of a rectangular touch sensing surface 116 having a force sensitive element at each of its corners. Locations on touch sensing surface 116 are designated by Cartesian coordinates according to X-axis 821 and Y-axis 822. With reference to FIG. 8, the processing logic may calculate the location of force centroid 801 using Equations 1 and 2:

$$x = \text{Size\_x} \cdot \frac{sB + sD}{sA + sB + sC + sD} \quad \text{(Equation 1)}$$

$$y = \text{Size\_y} \cdot \frac{sC + sD}{sA + sB + sC + sD} \quad \text{(Equation 2)}$$

In Equations 1 and 2, (x,y) is the location of the force centroid in a Cartesian coordinate system, Size_x is the width of the touch sensing surface 116, Size_y is the height of the touch sensing surface 116, and sA, sB, sC, and sD are magnitudes of forces measured at the force sensitive elements 122(1)-122(4), respectively.

In an embodiment, when only one touch is present at the touch sensing surface 116, the location of the force centroid 801 corresponds to the location of the touch. Thus, the processing logic may determine the location of the touch by calculating the touch location from the touch signal, by calculating the location of a force centroid from relative force signals, or both. For example, the processing logic may determine the location of the single touch by averaging the locations of the force centroid and the location of the touch as detected by the touch sensor.

The processing logic may calculate the magnitude of the force applied by the single touch using Equation 3 below.

$$sF = sA + sB + sC + sD \quad \text{(Equation 3)}$$

In Equation 3, sF represents the force applied by the single touch, which can be calculated as the sum of the forces sA, sB, sC, and sD measured by the force sensitive elements 122(1)-122(4).

Figure 9:
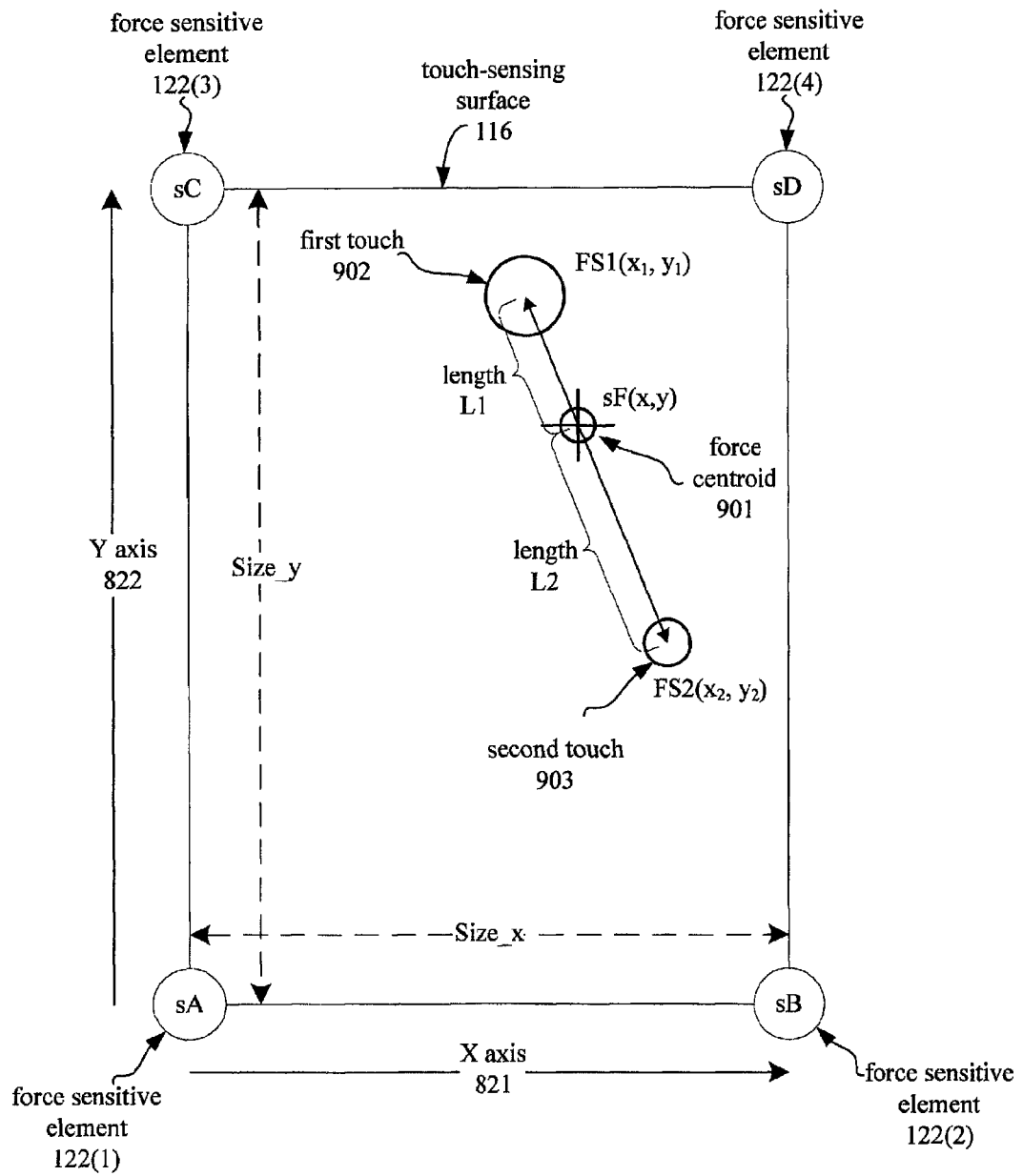
FIG. 9 illustrates an embodiment of a touch sensing surface with force applied at two touch locations.

FIG. 9 illustrates two touches on a rectangular touch sensing surface 116 having one of force sensitive elements 122(1)-122(4) at each of its corners. Locations on touch sensing surface 116 are designated by Cartesian coordinates according to X-axis 821 and Y-axis 822. In an embodiment, when two touches are present at the touch sensing surface 116, the component forces applied by each of the touches to the sensing surface 116 may be calculated using the location and magnitude sF of the force centroid, the locations of the two touches, and a lever balance equation, which is expressed as Equation 4.

Equation 5 expresses the length L1 in terms of the Cartesian coordinate locations of the first touch 902 at $(x_1, y_1)$ and the force centroid at $(x, y)$. Equation 6 expresses the length L2 in terms of the Cartesian coordinate locations of the second touch 903 at $(x_2, y_2)$ and the force centroid at $(x, y)$.

$$FS1 \cdot L1 = FS2 \cdot L2 \quad \text{(Equation 4)}$$

$$L1 = \sqrt{(x-x_1)^2 + (y-y_1)^2} \quad \text{(Equation 5)}$$

$$L2 = \sqrt{(x-x_2)^2 + (y-y_2)^2} \quad \text{(Equation 6)}$$

Equations 4, 5, and 6 can be simplified into the system of equations expressed in Equations 7.

$$\begin{cases} FS1 \cdot L1 = FS2 \cdot L2 \\ FS1 + FS2 = sA + sB + sC + sD \end{cases} \quad \text{(Equations 7)}$$

In Equations 7, FS1 represents the component force applied by the first touch at location $(x_1, y_1)$, L1 represents the distance between the first touch and the force centroid at $(x, y)$, FS2 represents the component force applied by the second touch at location $(x_2, y_2)$, and L2 represents the distance between the second touch and the force centroid. The forces detected by force sensitive elements 122(1)-122(4) are represented in Equations 7 by sA, sB, sC, and sD.

Solving the Equations 7 for the component forces FS1 and FS2 of the first touch and the second touch, respectively, yields Equations 8 and 9.

$$FS1 = \frac{sA + sB + sC + sD}{L1 + L2} \cdot L2 \quad \text{(Equation 8)}$$

$$FS2 = \frac{sA + sB + sC + sD}{L1 + L2} \cdot L1 \quad \text{(Equation 9)}$$

In an embodiment, the processing logic determines the component forces applied by each of the two touches using Equations 8 and 9.

Figure 10:
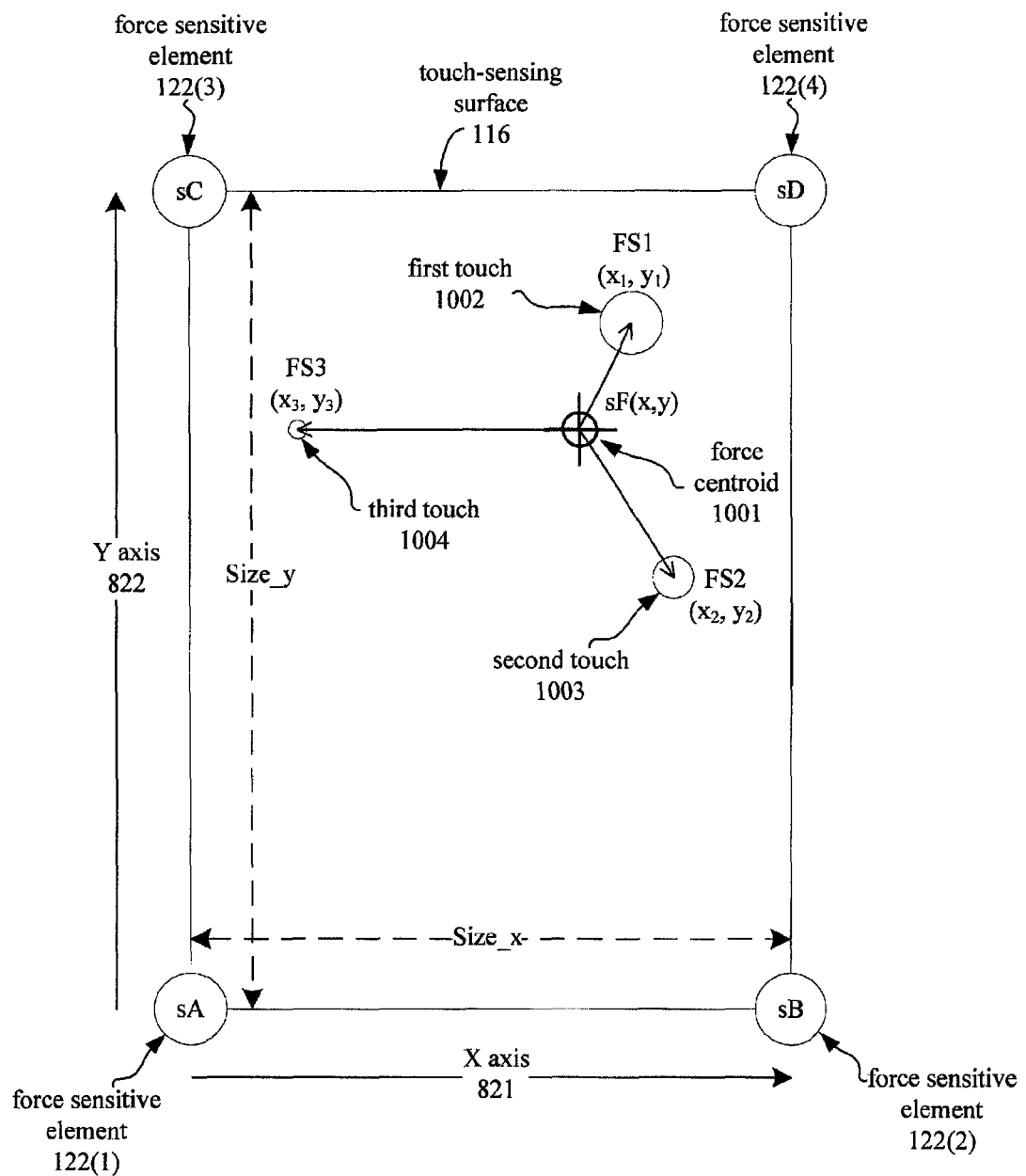
FIG. 10 illustrates an embodiment of a touch sensing surface with force applied at three touch locations.

FIG. 10 illustrates three touches on a rectangular touch sensing surface 116 having one of force sensitive elements 122(1)-122(4) at each of its corners. Locations on touch sensing surface 116 are designated by Cartesian coordinates according to X-axis 821 and Y-axis 822. In an embodiment, when three touches are present at the touch sensing surface 116, the component forces applied by each of the touches to the sensing surface 116 may be calculated using the location and magnitude sF of the force centroid, the locations of the three touches, and a system of equations relating these values, which is expressed in Equations 10.

$$\begin{cases} FS1 \cdot (x - x_1) + FS2 \cdot (x - x_2) + FS3 \cdot (x - x_3) = 0 \\ FS1 \cdot (y - y_1) + FS2 \cdot (y - y_2) + FS3 \cdot (y - y_3) = 0 \\ FS1 + FS2 + FS3 = sA + sB + sC + sD \end{cases} \quad \text{(Equation 10)}$$

In Equations 10, FS1, FS2, and FS3 represent the component forces applied by the first touch, the second touch, and the third touch, respectively, and $(x_1, y_1)$, $(x_2, y_2)$, and $(x_3, y_3)$ represent Cartesian coordinates locations of the first, second, and third touches, respectively. The forces measured by the force sensitive elements 122(1)-122(4) are represented by sA, sB, sC, and sD.

Solving for FS1, FS2, and FS3 results in Equations 11, 12, and 13, respectively.

$$FS1 = \frac{x \cdot y_2 - x_2 \cdot y - x \cdot y_3 + x_3 \cdot y + x_2 \cdot y_3 - x_3 \cdot y_2}{x_1 \cdot y_2 - x_2 \cdot y_1 - x_1 \cdot y_3 + x_3 \cdot y_1 + x_2 \cdot y_3 - x_3 \cdot y_2} \cdot (sA + sB + sC + sD) \quad \text{(Equation 11)}$$

$$FS2 = \frac{x \cdot y_1 - x_1 \cdot y - x \cdot y_3 + x_3 \cdot y + x_1 \cdot y_3 - x_3 \cdot y_1}{x_1 \cdot y_2 - x_2 \cdot y_1 - x_1 \cdot y_3 + x_3 \cdot y_1 + x_2 \cdot y_3 - x_3 \cdot y_2} \cdot (sA + sB + sC + sD) \quad \text{(Equation 12)}$$

$$FS3 = \frac{x \cdot y_1 - x_1 \cdot y - x \cdot y_2 + x_2 \cdot y + x_1 \cdot y_2 - x_2 \cdot y_1}{x_1 \cdot y_2 - x_2 \cdot y_1 - x_1 \cdot y_3 + x_3 \cdot y_1 + x_2 \cdot y_3 - x_3 \cdot y_2} \cdot (sA + sB + sC + sD) \quad \text{(Equation 13)}$$

In an embodiment, the processing logic 102 may determine the component forces FS1, FS2, and FS3 that are applied by the first, second, and third touches at the sensing surface 116 using the relationships described in Equations 11, 12, and 13.

In an embodiment, the Equations 11, 12, and 13 are used when the three touches are not in a straight line. Equation 14 describes the condition where the three touches, at Cartesian coordinate locations $(x_1, y_1)$, $(x_2, y_2)$, and $(x_3, y_3)$ are not in a straight line.

$$x_1 \cdot y_2 - x_2 \cdot y_1 - x_1 \cdot y_3 + x_3 \cdot y_1 + x_2 \cdot y_3 - x_3 \cdot y_2 \neq 0 \quad \text{(Equation 14)}$$

Figure 11:
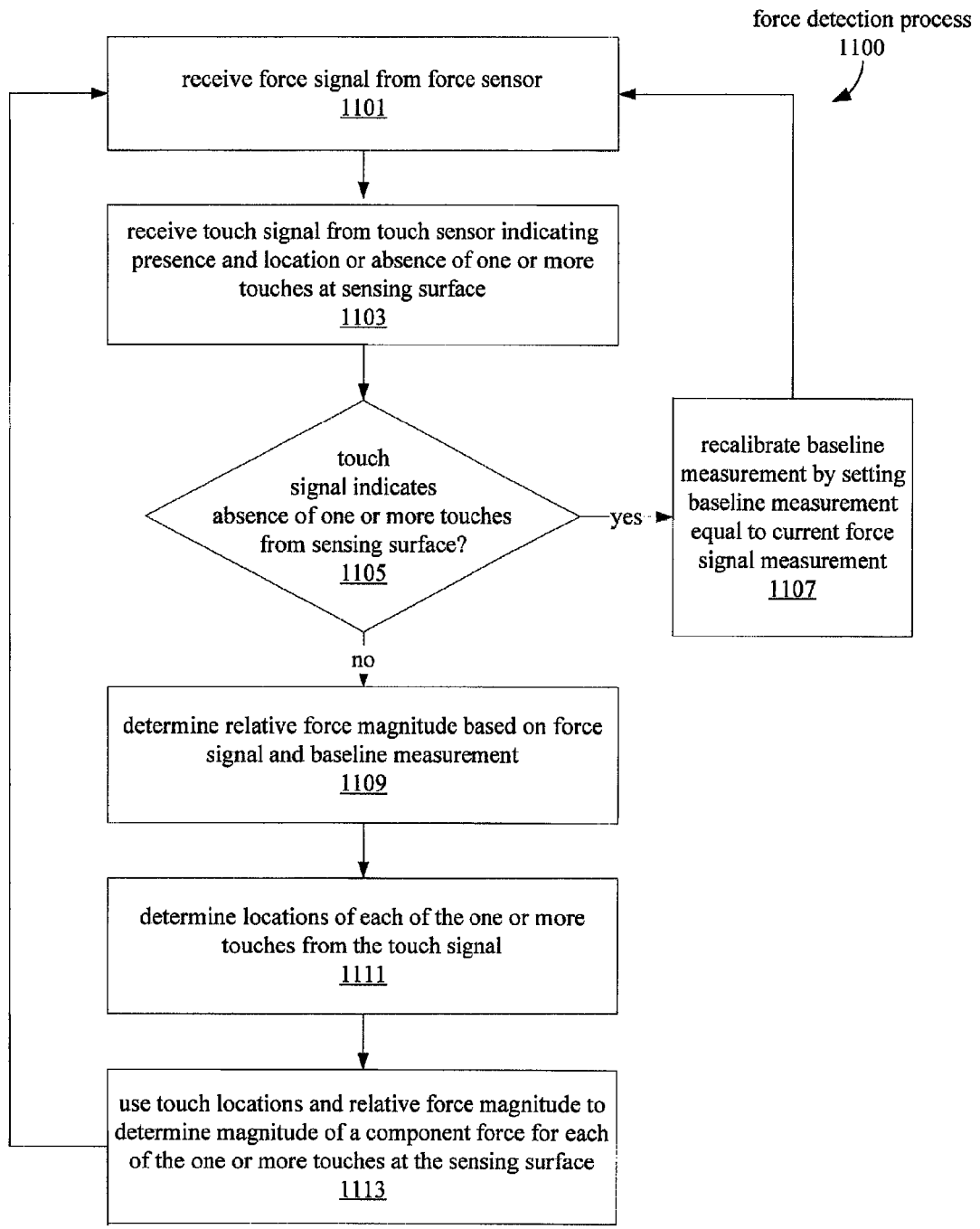
FIG. 11 is a flow diagram illustrating a force detection process, according to an embodiment.

FIG. 11 is a flow diagram illustrating a force detection process 1100 for determining a component force applied by each of one or more touches to a sensing surface. In an embodiment, process 1100 may be performed by processing logic, such as processing logic 102. The operations of process 1100 that may be performed by processing logic 102 may alternatively be performed in host 150.

Force detection process 1100 begins at block 1101, at which the processing logic receives a force signal from the force sensor. For example, processing logic 102 may receive the force signal from force sensor 104 at a force sensor input. In an embodiment, the force signal indicates a force measured by each of a number of force sensitive element, such as force sensitive elements 122(1)-122(N). From block 1101, the process 1100 continues at block 1103.

At block 1103, the processing logic receives a touch signal from a touch sensor. For example, in an embodiment where the touch sensor is a capacitive sensor array 121, the processing logic 102 may receive a touch signal from capacitance sensor 101 at a touch sensor input. In an embodiment, the touch signal indicates the presence or absence of one or more touches at the touch sensing surface. From block 1103, the process 1100 continues at block 1105.

At block 1105, the processing logic determines whether the touch signal indicates the absence of one or more touches at the sensing surface. If the touch signal indicates the absence of the one or more touches at the sensing surface, the process 1100 continues at block 1107.

At block 1107, the processing logic performs a baseline recalibration by setting the baseline measurement equal to a raw force signal measurement, where the raw force signal measurement is acquired at a time when the one or more touches are absent from the sensing surface. For example, when no touch is present at the touch sensing surface 116, the absence of any touch is indicated in the touch signal transmitted from the capacitance sensor 101 to the touch signal input of the processing logic 102. Processing logic 102, in response to determining from the touch signal that no touch is present at the sensing surface 116, responds by acquiring a present measurement of the force signal from force sensor 104. The measurement is stored as a new baseline measurement. From block 1107, the process 1100 continues back to block 1101.

If, at block 1105, the touch signal does not indicate that the one or more touches are absent from the sensing surface, the process 1100 continues at block 1109. At block 1109, the processing logic determines a relative force magnitude based on the force signal and the baseline measurement. For example, the processing logic 102 may calculate the magnitude of the relative force signal by calculating the difference between the baseline measurement and a raw force signal received from force sensor 104. From block 1109, the process 1100 continues at block 1111.

At block 1111, the processing logic uses the touch signal to determine locations of each of the one or more touches. In an embodiment, the touch sensing surface may include a grid or other arrangement of sensor that allows the locations of multiple touches to be determined. For example, the sensor array 121 includes a grid of capacitive sensor elements 121(1)-121(N) and is configured to detect locations of multiple touches applied to the sensing surface 116. The location information is indicated in the touch signal transmitted from capacitance sensor 101 to processing logic 102. Processing logic 102 determines the touch locations from the received touch signal. From block 1111, the process 1100 continues at block 1113.

At block 1113, the processing logic uses the touch locations and the relative force magnitude to determine a magnitude of a component force for each of the one or more touches at the sensing surface. In an embodiment, the processing logic may determine the number of touches that are being applied to the touch sensing surface. Depending on the number of touches, the processing logic may determine the component forces using one of a number of operations. For example, the processing logic may use a system of equations, a lever balance equation, or may alternatively set the component force equal to the total relative force. The operations of block 1113 are further described with reference to FIG. 12. From block 1113, the process 1100 continues back to block 1101.

Figure 12:
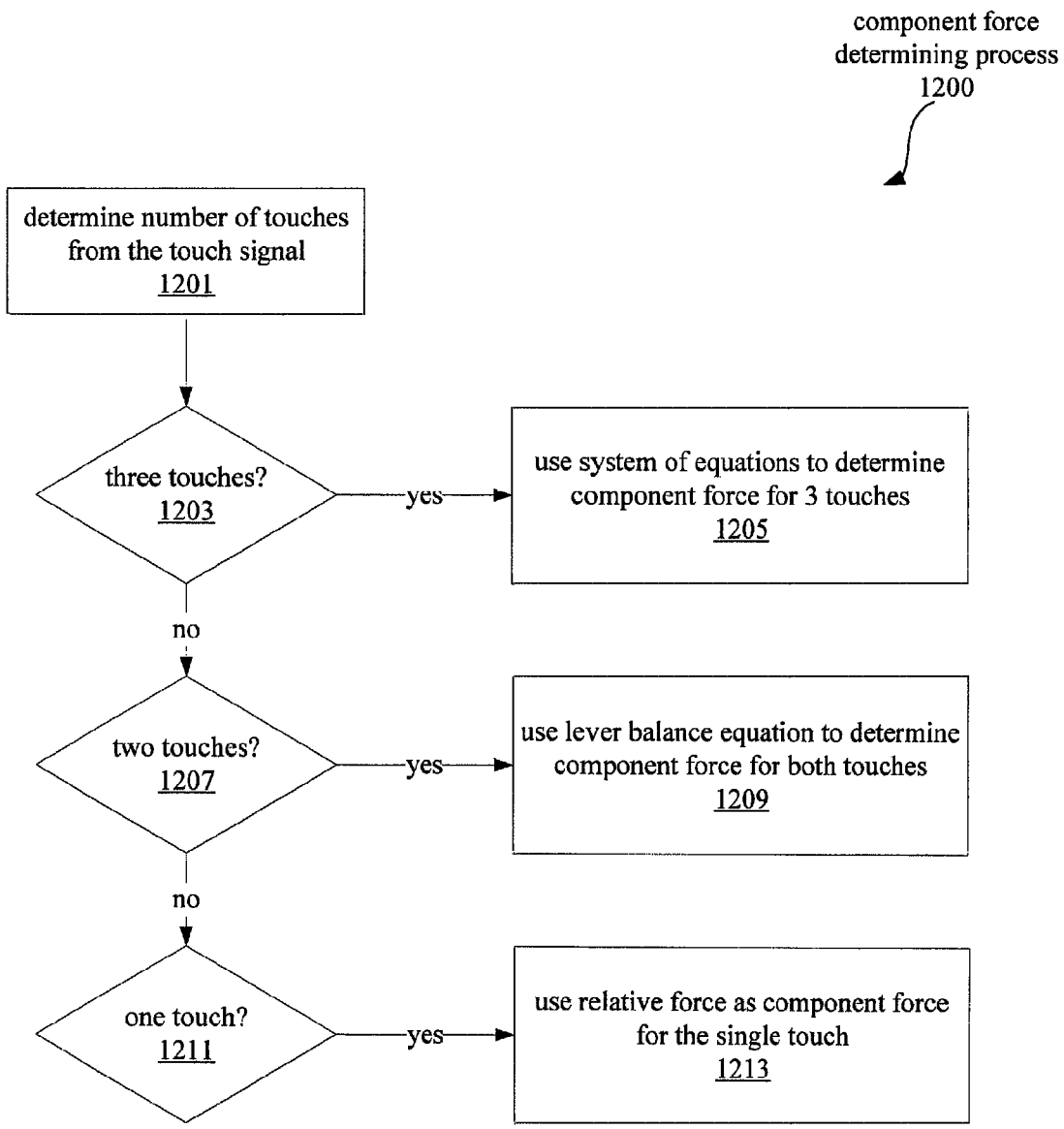
FIG. 12 is a flow diagram illustrating a component force determining process, according to an embodiment.

FIG. 12 is a flow diagram illustrating a component force determining process 1200, according to an embodiment. In an embodiment, the operations of process 1200 correspond to operations that may be performed in block 1113 of FIG. 11.

The process 1200 begins at block 1201. At block 1201, the processing logic determines the number of touches present at the touch sensing surface from the touch signal. From block 1201, the process 1200 continues at block 1203.

At block 1203, if three touches are present at the touch sensing surface, the process 1200 continues at block 1205.

At block 1205, the processing logic uses a system of equations to determine a component force for each of the three touches. In an embodiment, the processing logic 102 uses the system of equations expressed in Equations 10 to determine a component force for each of the three touches at sensing surface 116.

If, at block 1203, three touches are not present at the sensing surface, the process 1200 continues at block 1207. At block 1207, if two touches are present at the touch sensing surface, the process 1200 continues at block 1209.

At block 1209, the processing logic uses a lever balance equation to determine a component force for each of the two touches. In an embodiment, the lever balance equation and the equations for the distance between a force centroid and touch locations (as expressed in Equation 4, 5, and 6) can be simplified to a system of equations as expressed in Equations 7. In an embodiment, the processing logic determines the component force for each of the two touches using this system of equations.

If, at block 1207, two touches are not present at the sensing surface, the process 1200 continues at block 1211. At block 1211, if one touch is present at the touch sensing surface, the process 1200 continues at block 1213.

At block 1213, the processing logic uses a relative force as the component force for the single touch. For example, with reference to FIGS. 1 and 8, the processing logic 102 may calculate a force sF applied by the single touch by summing the forces sA, sB, sC, and sD measured by the force sensitive elements 122(1)-122(4), in accord with Equation 3.

Thus, the processing logic determines a component force for each of the one or more touches at the touch sensing surface. In an embodiment, the component forces associated with each of the touches may be used to implement functions of a user interface, and may allow a user to perform actions such as changing modes or manipulate objects in a graphical user interface. In an embodiment, the detection of component forces may also be used to identify false touches. For example, an on-screen keyboard application may use the component forces to determine whether a user intended to activate a key.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
one or more inputs configured to receive a force signal from a force sensor and a touch signal from a touch sensor, wherein the force signal indicates a magnitude of a force applied at a sensing surface, and wherein the touch sensor includes a capacitance sensor; and
processing logic coupled with the one or more inputs, wherein the processing logic is configured to
determine a relative force magnitude based on the force signal and a baseline measurement of the force sensor, and
update the baseline measurement of the force sensor in response to the touch signal received from the capacitance sensor that indicates a removal of one or more touches from the sensing surface, the force signal being received after a detecting of the removal of the one or more touches from the sensing surface, the force signal being a raw force signal, wherein the update of the baseline measurement of the force sensor comprises setting the baseline measurement equal to a signal level of the force signal, wherein the signal level corresponds to a time during which the touch signal indicates that the one or more touches are removed from the sensing surface.

2. The apparatus of claim 1, wherein the touch signal indicates an absence of the one or more touches from the sensing surface by indicating the removal of the one or more touches from the sensing surface.

3. The apparatus of claim 1, wherein the removal of the one or more touches from the sensing surface corresponds to a falling edge of the touch signal.

4. The apparatus of claim 1, wherein the touch sensor includes an array of capacitive sensor elements.

5. The apparatus of claim 1, wherein the touch signal indicates a location for each of the one or more touches at the sensing surface.

6. The apparatus of claim 1, wherein the force sensor comprises a plurality of force sensitive elements, and wherein the force signal is generated from a plurality of force signals each generated by one of the plurality of force sensitive elements.

7. The apparatus of claim 1, wherein the processing logic is configured to calculate, using the force signal, a magnitude of a component force applied by each of the one or more touches at the sensing surface.

8. A method, comprising:
receiving from a force sensor a force signal indicating a magnitude of a force applied at a sensing surface;
receiving a touch signal from a touch sensor, wherein the touch sensor includes a capacitance sensor;
determining a relative force magnitude based on the force signal and a baseline measurement of the force sensor; and
updating the baseline measurement of the force sensor in response to the touch signal received from the capacitance sensor that indicates a removal of one or more touches from the sensing surface, the force signal being received after a detecting of the removal of the one or more touches from the sensing surface, the force signal being a raw force signal,
wherein the updating of the baseline measurement of the force sensor comprises setting the baseline measurement equal to a signal level of the force signal, wherein the signal level corresponds to a time during which the touch signal indicates that the one or more touches are removed from the sensing surface.

9. The method of claim 8, wherein detecting the removal of the one or more touches from the sensing surface comprises detecting a falling edge of the touch signal.

10. The method of claim 8, further comprising determining, from the touch signal, a location for each of the one or more touches at the sensing surface.

11. The method of claim 8, further comprising generating the force signal from a plurality of force signals, wherein each of the plurality of force signals is generated by one of a plurality of force sensing resistors.

12. The method of claim 8, further comprising calculating, using the force signal, a magnitude of a component force applied by each of the one or more touches at the sensing surface.

13. The method of claim 8, wherein updating the baseline of the force sensor comprises setting the baseline equal to a measurement of a signal generated by the force sensor while the one or more touches are absent from the sensing surface.

14. An apparatus, comprising:
a force sensor input configured to receive, from a force sensor, a force signal indicating a magnitude of one or more forces applied at a sensing surface;
a touch sensor input configured to receive, from a touch sensor, a touch signal indicating a location of each of one or more touches at the sensing surface, wherein the touch sensor includes a capacitance sensor; and
processing logic coupled with the force sensor input and the touch sensor input, wherein the processing logic is configured to determine, based on the force signal and the locations of each of the one or more touches, a magnitude of a force applied by each of the one or more touches at the sensing surface, and wherein the processing logic is further configured to update a baseline measurement of the force sensor in response to the touch signal received from the capacitance sensor that indicates a removal of the one or more touches from the sensing surface, the force signal being received after a detecting of the removal of the one or more touches from the sensing surface, the force signal being a raw force signal,
wherein the update of the baseline measurement of the force sensor comprises setting the baseline measurement equal to a signal level of the force signal, wherein the signal level corresponds to a time during which the touch signal indicates that the one or more touches are removed from the sensing surface.

15. The apparatus of claim 14, wherein the processing logic is further configured to determine a relative force magnitude based on the force signal and the baseline measurement of the force sensor.

16. A method, comprising:
receiving from a force sensor a force signal indicating a magnitude for each of one or more forces measured by one or more force sensing elements at a sensing surface;
receiving from a touch sensor a touch signal indicating a location of each of one or more touches at the sensing surface, wherein the touch sensor includes a capacitance sensor;
determining, based on the magnitude for each of the one or more forces and the location of each of the one or more touches, a magnitude of a component force for each of the one or more touches at the sensing surface; and
updating a baseline measurement of the force sensor in response the touch signal received from the capacitance sensor that indicates a removal of the one or more touches from the sensing surface, the force signal being received after a detecting of the removal of the one or more touches from the sensing surface, the force signal being a raw force signal,
wherein the update of the baseline measurement of the force sensor comprises setting the baseline measurement equal to a signal level of the force signal, wherein the signal level corresponds to a time during which the touch signal indicates that the one or more touches are removed from the sensing surface.

17. The method of claim 16, further comprising: determining the relative force magnitude based on the force signal and the baseline measurement of the force sensor.

18. The apparatus of claim 1, wherein the processing logic is configured to update the baseline measurement of the force sensor in response to detecting a falling edge of the touch signal.

19. The method of claim 8, wherein the updating of the baseline measurement of the force sensor is responsive to detecting a falling edge of the touch signal.

20. The apparatus of claim 14, wherein the removal of the one or more touches from the sensing surface corresponds to a falling edge of the touch signal.

21. The apparatus of claim 14, wherein the touch sensor includes an array of capacitive sensor elements.

22. The apparatus of claim 14, wherein the force sensor comprises a plurality of force sensitive elements, and wherein the force signal is generated from a plurality of force signals each generated by one of the plurality of force sensitive elements.

23. The method of claim 16, wherein detecting the removal of the one or more touches from the sensing surface comprises detecting a falling edge of the touch signal.

24. The method of claim 16, further comprising generating the force signal from a plurality of force signals, wherein each of the plurality of force signals is generated by one of a plurality of force sensing resistors.

* * * * *